United States Patent
Chen et al.

(10) Patent No.: US 6,782,278 B2
(45) Date of Patent: Aug. 24, 2004

(54) DIALING METHOD FOR DYNAMICALLY SIMPLIFYING INTERNATIONAL CALL IN CELLULAR PHONE

(75) Inventors: Kun-Huei Chen, Taipei Hsieng (TW); Chin-Tai Chuang, Taipei Hsieng (TW)

(73) Assignee: Inventec Appliances Corp., Taipei Hsieng (TW)

( * ) Notice: Subject to any disclaimer, the term of this patent is extended or adjusted under 35 U.S.C. 154(b) by 476 days.

(21) Appl. No.: 09/912,513

(22) Filed: Jul. 26, 2001

(65) Prior Publication Data

US 2003/0022698 A1 Jan. 30, 2003

(51) Int. Cl.[7] ............................. H04Q 7/32; H04Q 7/20
(52) U.S. Cl. .................. 455/564; 455/550.1; 455/551; 455/432.1
(58) Field of Search ............................. 455/564, 550.1, 455/412.1, 412.2, 432.1, 432.2, 432.3, 435.1, 435.2, 435.3, 426.1, 422.1, 403, 445, 517, 556.1, 556.2, 557, 414.1, 414.2, 417, 456.1, 456.2, 457, 551, 552.1; 379/216.01

(56) References Cited

U.S. PATENT DOCUMENTS 5,590,397 A * 12/1996 Kojima ..................... 455/417
2002/0160815 A1 * 10/2002 Patel et al. ................ 455/564

* cited by examiner

Primary Examiner—William Trost
Assistant Examiner—Keith Ferguson
(74) Attorney, Agent, or Firm—Bacon & Thomas, PLLC

(57) ABSTRACT

A method for dynamically simplifying an international call in a cellular phone utilizes a conversion table for storing system codes of a plurality of network companies worldwide and their international access codes, and a phone record for storing a plurality of telephone numbers having international access codes respectively of different called parties in the database thereof. The cellular phone is able to determine the current location area while calling in international roaming and find the correct international access code from the conversion table in accordance with a system code received from a proximate network company, for replacing the international access code in the telephone number searched from the phone record.

4 Claims, 2 Drawing Sheets

US 6,782,278 B2

DIALING METHOD FOR DYNAMICALLY SIMPLIFYING INTERNATIONAL CALL IN CELLULAR PHONE

FIELD OF THE INVENTION

The present invention relates to cellular phones and more particularly to a dialing method for dynamically simplifying an international call in a cellular phone.

BACKGROUND OF THE INVENTION

Cellular phones have been popular worldwide in recent years due to their portability, versatility, and inexpensive unit price, as a communication device for social or business purposes. Further, as compared to conventional wire telephones, cellular phones have advantages in certain fields such as convenience in an outdoor environment and portability. However, the functionalities of cellular phones have not been perfect. For example, in international roaming, a successful cellular phone call is made possible only after a calling party knows the international access code of a called party in advance, i.e., the calling party has to dial the international access code and the called party's telephone number (including national code, area code and number) sequentially. In another example of attempting to set up a conference call with different people located in different countries, the searching process for corresponding international access codes and operation thereof are even more complex and time consuming. This really bothers cellular phone users, thus causing inconvenience. Hence, there is a need to solve the above problems associated with international roaming initiated by cellular phones. Moreover, it is desirable to provide a novel cellular phone which is capable of performing a dialing method for dynamically simplifying an international call in a convenient effective manner in order to overcome the above drawbacks of the prior art.

SUMMARY OF THE INVENTION

It is therefore an object of the present invention to provide a method for dynamically simplifying an international call in a cellular phone comprising the steps of storing system codes of a plurality of network companies worldwide and international access codes in a conversion table in a database of a memory of the cellular phone and storing a plurality of telephone numbers (including international access code, national code, area code and number) of different called parties in a phone record in the database after the communications thereof are finished; searching for the telephone number stored in the phone record according to the phone numbers (with or without an international access code) being dialed; determining whether the international access code of an proximate network company associated with the current location area of the phone number being dialed is different from the original location area of the same telephone number while being stored in the phone record; if different, accessing the conversion table in memory and searching for a correct international access code in accordance with a system code received from the network company in the current location area; replacing the international access code in the telephone number retrieved from the phone record by the correct international access code being searched; and showing the telephone number having the correct international access code on a display of the cellular phone.

The above and other objects, features and advantages of the present invention will become apparent from the following detailed description taken with the accompanying drawings.

DETAILED DESCRIPTION OF THE PREFERRED EMBODIMENTS

The invention is directed to a dialing method for dynamically simplifying an international call in a cellular phone. The cellular phone comprises a database in a memory 11 thereof having a conversion table for storing system codes of major network companies worldwide and their international access codes, and a phone record for storing telephone numbers, each including international access code, national code, area code and number, after being dialed by a user of cellular phone.

According to the invention, the cellular phone will store the international access code, national code, area code and number of a telephone number after it has been dialed and the communication thereof is finished. During international roaming, a user can input a telephone number dialed before with or without an international access code and the cellular phone will search the phone record and find the telephone number having the international access code being dialed. A central processing unit (CPU) 13 of the cellular phone will then determine whether the international access code of an proximate network company associated with the current location area of this calling is different from the international access code of the network company associated with the original location area of storing the same telephone number into the cellular phone. If different, the CPU 13 may accordingly access the conversion table in memory 11 and search for the international access code from the conversion table in accordance with the system code received from the proximate network company in the current location area, and replace the international access code in the telephone number retrieved from the phone record by the international access code being searched. Then, the telephone number with the correct international access code is automatically shown on display 15 of the user's cellular phone and is dialed out for calling the called party. As a result, a successful international roaming call is made when a cellular phone user simply dials a called party's telephone number in the phone record. This greatly reduces steps in effecting an international call using a cellular phone. By utilizing this method, problems associated with the prior art in international roaming, i.e., a complex and time consuming searching process for a corresponding international access code and area code and operation thereof, etc., are substantially eliminated.

Figure 1:
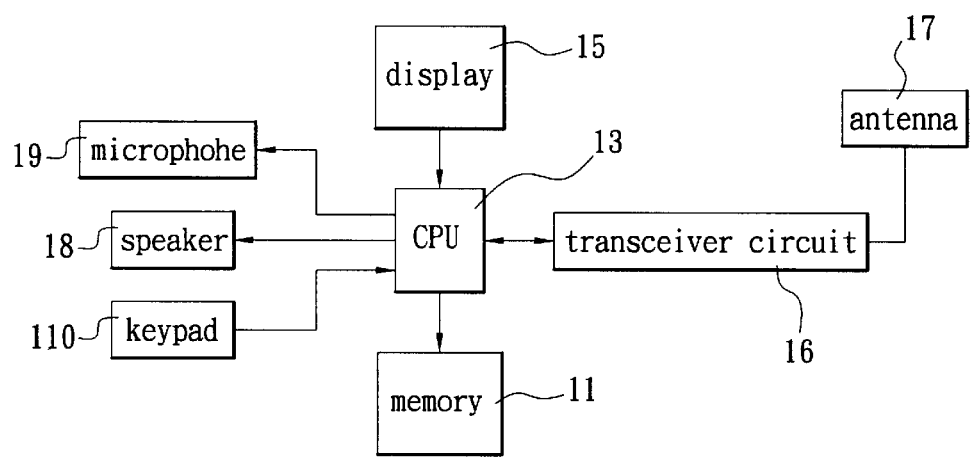
FIG. 1 is a block diagram of electronic elements of a cellular phone for effecting an international call according to the invention.

FIG. 1 is a block diagram of electronic elements of a cellular phone which is capable of dynamically simplifying an international call in a cellular phone according to the invention. CPU 13 of the cellular phone may establish a connection with a base station through transceiver circuit 16 and antenna 17. Hence, CPU 13 may receive telephone signals from the base station. The received signals are converted into sound waves prior to amplifying the same through speaker 18. Also, sound waves from microphone 19 are received by CPU 13. The received sound waves are converted into telephone signals in CPU 13 prior to transmitting to the base station through transceiver circuit 16 and antenna 17. Moreover, CPU 13 may send processed data to display 15 for showing and memory 11 for storing. In addition, CPU 13 may access data stored in memory 11. Additionally, CPU 13 may receive alphanumeric data input by the user through keypad 110.

Figure 2:
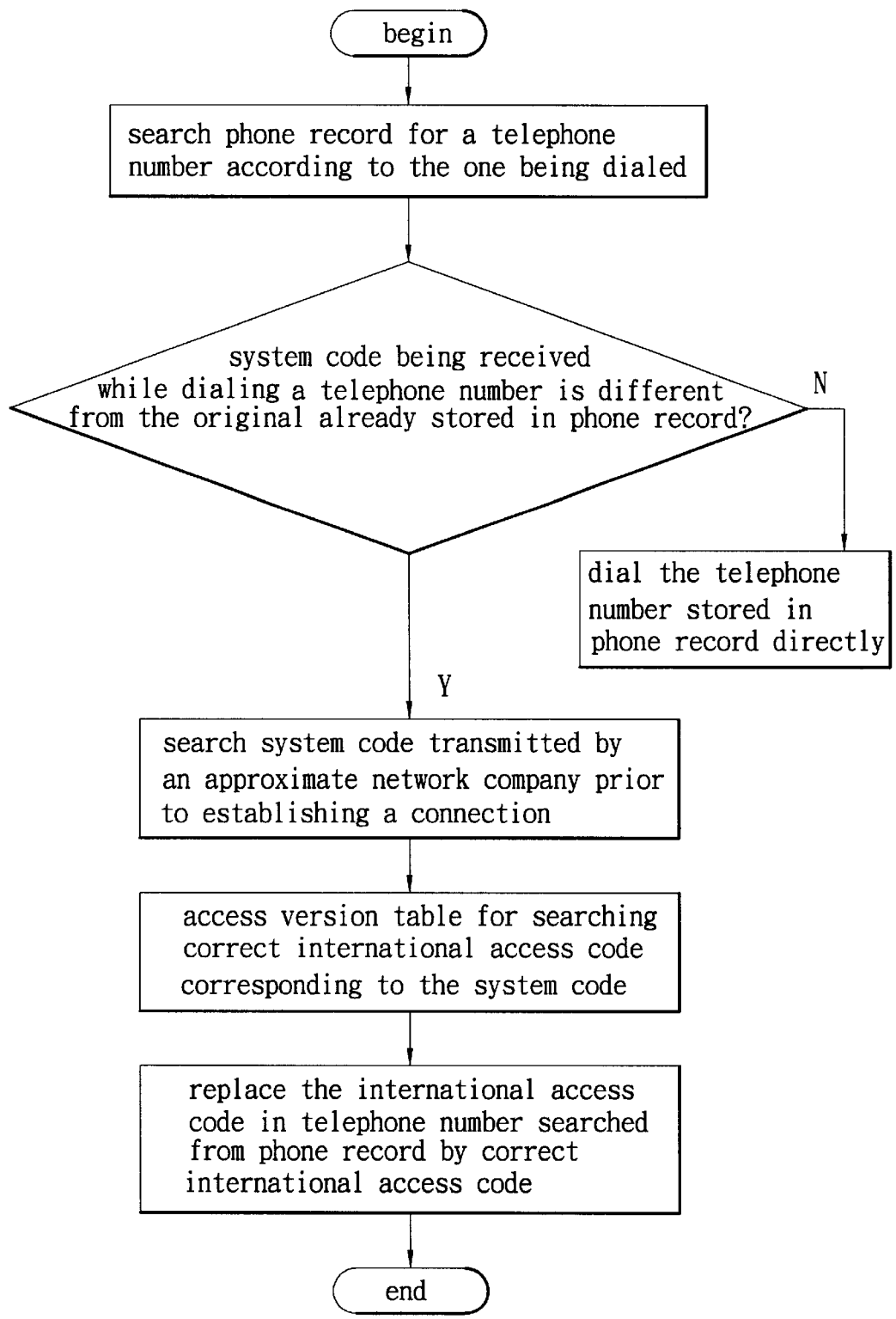
FIG. 2 is a flow chart of a dialing method for dynamically simplifying an international call in the FIG. 1 cellular phone.

FIG. 2 is a flow chart of a dialing process illustrating how to simplify an international call in the FIG. 1 cellular phone. After the cellular phone is activated to call a called party's telephone number having an international access code, the telephone number will be stored in the phone record while the communication is finished. Then, in international roaming, when a telephone number is dialed, CPU 13 of the cellular phone may perform the following steps. In step 1, the CPU 13 determines whether the system code of the network company associated with the current location area of this calling is different from the system code of the network company associated with the original location area of the same telephone number already stored in the phone record. If same, CPU 13 dials the telephone number stored in the phone record directly. If different, CPU 13 receives a system code transmitted by the proximate network company prior to establishing a connection therewith in order to recognize the current location area of this calling (step 2). Then, CPU 13 searches the conversion table therein for a correct international access code in accordance with the system code received from the proximate network company (step 3). Then, CPU 13 replaces the international access code in the telephone number searched from the phone record by the correct international access code being searched and shows the same on display 15 of the cellular phone before dialing out (step 4).

In brief, when a cellular phone user has entered into an international roaming and the cellular phone is activated to call a called party's telephone number, CPU 13 may access a conversion table in memory 11 for finding the correct international access code in accordance with the system code received from the proximate network company, replace the international access code in the telephone number retrieved from the phone record, and showing the same on display 15 of the cellular phone. Finally, the telephone number with the correct international access code is dialed out. This is a convenient and practical method for dynamically simplifying an international call in a cellular phone. By utilizing this, problems associated with the prior art, such as inconvenience in making a conference call among several people located in different countries, resulting from the complex and time consuming searching process for corresponding international access codes and area codes and operation thereof, etc. are substantially eliminated.

Moreover, such cellular phone may be implemented as a personal digital assistant (PDA) having a cellular phone functionality.

While the invention has been described by means of specific embodiments, numerous modifications and variations could be made thereto by those skilled in the art without departing from the scope and spirit of the invention set forth in the claims.

What is claimed is:

1. A method for dynamically simplifying an international call in a cellular phone comprises the steps of:

storing, in a conversion table, system codes of a plurality of network companies worldwide and their international access codes;

storing, in a database of a phone record, a plurality of telephone numbers having international access codes respectively in order to enable said cellular phone to recognize a current location area in accordance with a system code received from a proximate network company while calling in international roaming;

when a user dials a telephone number, comparing a system code received while dialing the number with a system code stored in a phone record for the number;

if the received and stored system codes are the same, directly dialing the telephone number stored in the phone record;

if the received and stored system codes are different finding the corresponding international access code from the conversion table; and replacing the international access code in a telephone number retrieved from said phone record.

2. The method of claim 1, wherein said cellular phone dials the telephone number stored in the phone record directly after determining that said current location area of calling is the same as an original location area of storing the telephone number into said phone record.

3. The method of claim 1, wherein said cellular phone shows a telephone number with said international access code retrieved from said conversion table on a display of the cellular phone before dialing.

4. The method of claim 1, wherein said cellular phone is a personal digital assistant (PDA) having a cellular phone functionality.

* * * * *